(12) United States Patent
Pentland et al.

(10) Patent No.: US 10,686,586 B2
(45) Date of Patent: Jun. 16, 2020

(54) RE-ENCRYPTING DATA ON A HASH CHAIN

(71) Applicant: INTUIT INC., Mountain View, CA (US)

(72) Inventors: Ian R. Pentland, Mountain View, CA (US); Glenn Scott, Mountain View, CA (US); Roger Meike, Mountain View, CA (US); Michael R. Gabriel, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 376 days.

(21) Appl. No.: 15/852,345

(22) Filed: Dec. 22, 2017

(65) Prior Publication Data

US 2019/0199512 A1 Jun. 27, 2019

(51) Int. Cl.
*H04L 9/06* (2006.01)
*H04L 9/32* (2006.01)

(52) U.S. Cl.
CPC .............. *H04L 9/06* (2013.01); *H04L 9/0643* (2013.01); *H04L 9/3239* (2013.01); *H04L 2209/38* (2013.01)

(58) Field of Classification Search
CPC ....... H04L 9/06; H04L 9/0643; H04L 9/3239; H04L 2212/00; H04W 4/00
See application file for complete search history.

(56) References Cited

U.S. PATENT DOCUMENTS

| | | | |
|---|---|---|---|
| 8,832,466 B1 * | 9/2014 | McGregor, Jr. | H04L 9/0836 713/193 |
| 9,774,578 B1 | 9/2017 | Ateniese et al. | |
| 2014/0372393 A1 * | 12/2014 | Gosnell | G06F 21/6209 707/698 |
| 2016/0077977 A1 * | 3/2016 | Narayanamurthy | G06F 21/64 713/193 |
| 2017/0228317 A1 * | 8/2017 | Drapala | G06F 12/0815 |
| 2017/0228371 A1 | 8/2017 | Seger, II | |
| 2017/0373849 A1 * | 12/2017 | Donner | G06K 19/07758 |
| 2018/0130034 A1 * | 5/2018 | Taylor | G06Q 20/3674 |

FOREIGN PATENT DOCUMENTS

| | | |
|---|---|---|
| WO | 2017145009 A1 | 8/2017 |
| WO | 2017167549 A1 | 10/2017 |

OTHER PUBLICATIONS

International Search Report/ Written Opinion issued to PCT/US2018/044802 dated Nov. 26, 2018.
Michael Egorov et al. 'NuCypher KMS: Decentralized key management system'. 'NuCypher, NICS Lab, Nov. 15, 2017, pp. 1-21. See pp. 4-17; and figures 2-6.

* cited by examiner

*Primary Examiner* — Shanto Abedin
(74) *Attorney, Agent, or Firm* — Patterson + Sheridan, LLP

(57) ABSTRACT

Techniques are disclosed for managing encrypted data stored in one or more blocks of a first data structure. One embodiment presented herein includes a computer-implemented method, which includes retrieving the encrypted data from the one or more blocks. The method further includes placing the encrypted data in a container object. The method further includes applying an encryption technique to the container object to generate an encrypted container object and a key. The method further includes generating a second data structure. A first block of the second data structure may include either the encrypted container object or information related to the encrypted container object.

18 Claims, 6 Drawing Sheets

RE-ENCRYPTING DATA ON A HASH CHAIN

FIELD

The present disclosure relates generally to techniques for improving the security and efficiency of storing and accessing data in distributed systems, and more particularly to re-encrypting data stored on a hash chain.

BACKGROUND

Distributed systems may comprise hash chains (e.g., blockchains), which are data structures that record data in a fashion analogous to a chain. Each update to the chain creates a new block containing the data and each block is linked to the previous block by a cryptographic function. Blocks are generally appended to the end of the chain and, once in the chain, resist modification so that the cryptographic links in the chain are preserved. Entities (e.g., applications) that receive data from blocks of the chain may check the cryptographic links to test the validity of the chain. Any modification of a block is detected and subject to remedial or other action. Hash chains are generally managed by peer-to-peer networks, which collectively adhere to an established protocol for validating each new block and are designed to be inherently resistant to modification of data. Once recorded, the data in any given block cannot be modified without the alteration of subsequent blocks and the involvement of the network.

A chain generally has no upper limit on its storage capacity. This means that, as blocks are appended, the chain grows without bound. As a result, a chain consumes an increasing amount of storage resources as it is updated. Furthermore, while chains may exist indefinitely, circumstances may change that render the data on the chain vulnerable to security threats. For example, encryption techniques employed on blocks in the chain may become outdated or compromised. If encrypted data in a block needs to be re-encrypted (e.g., because of a comprised key, vulnerability discovered in the encryption technique, or the like), the payload of the block cannot be updated with re-encrypted data without breaking the cryptographic proof of correctness of the chain. This is because the re-encrypted data will produce a different hash for the block, making any blocks forward on the chain no longer refer to the newly updated block. As such, there exists a need for improved techniques of efficiently ensure the continuous security and privacy of data stored on hash chains.

SUMMARY

One embodiment presented herein includes a computer implemented method for managing encrypted data stored in one or more blocks of a first data structure. The method generally includes retrieving the encrypted data from the one or more blocks. The method further includes placing the encrypted data in a container object. The method further includes applying an encryption technique to the container object to generate an encrypted container object and a key. The method further includes generating a second data structure. A first block of the second data structure may include either the encrypted container object or information related to the encrypted container object.

Another embodiment of the present disclosure includes a processor and a memory storing a program, which, when executed on the processor, performs an operation for managing encrypted data stored in one or more blocks of a first data structure. The operation generally includes retrieving the encrypted data from the one or more blocks. The operation further includes placing the encrypted data in a container object. The operation further includes applying an encryption technique to the container object to generate an encrypted container object and a key. The operation further includes generating a second data structure. A first block of the second data structure may include either the encrypted container object or information related to the encrypted container object.

Still another embodiment provides a non-transitory computer-readable storage medium having instructions, which, when executed on a processor, performs an operation for managing encrypted data stored in one or more blocks of a first data structure. The operation generally includes retrieving the encrypted data from the one or more blocks. The operation further includes placing the encrypted data in a container object. The operation further includes applying an encryption technique to the container object to generate an encrypted container object and a key. The operation further includes generating a second data structure. A first block of the second data structure may include either the encrypted container object or information related to the encrypted container object.

DETAILED DESCRIPTION

Figure 1:
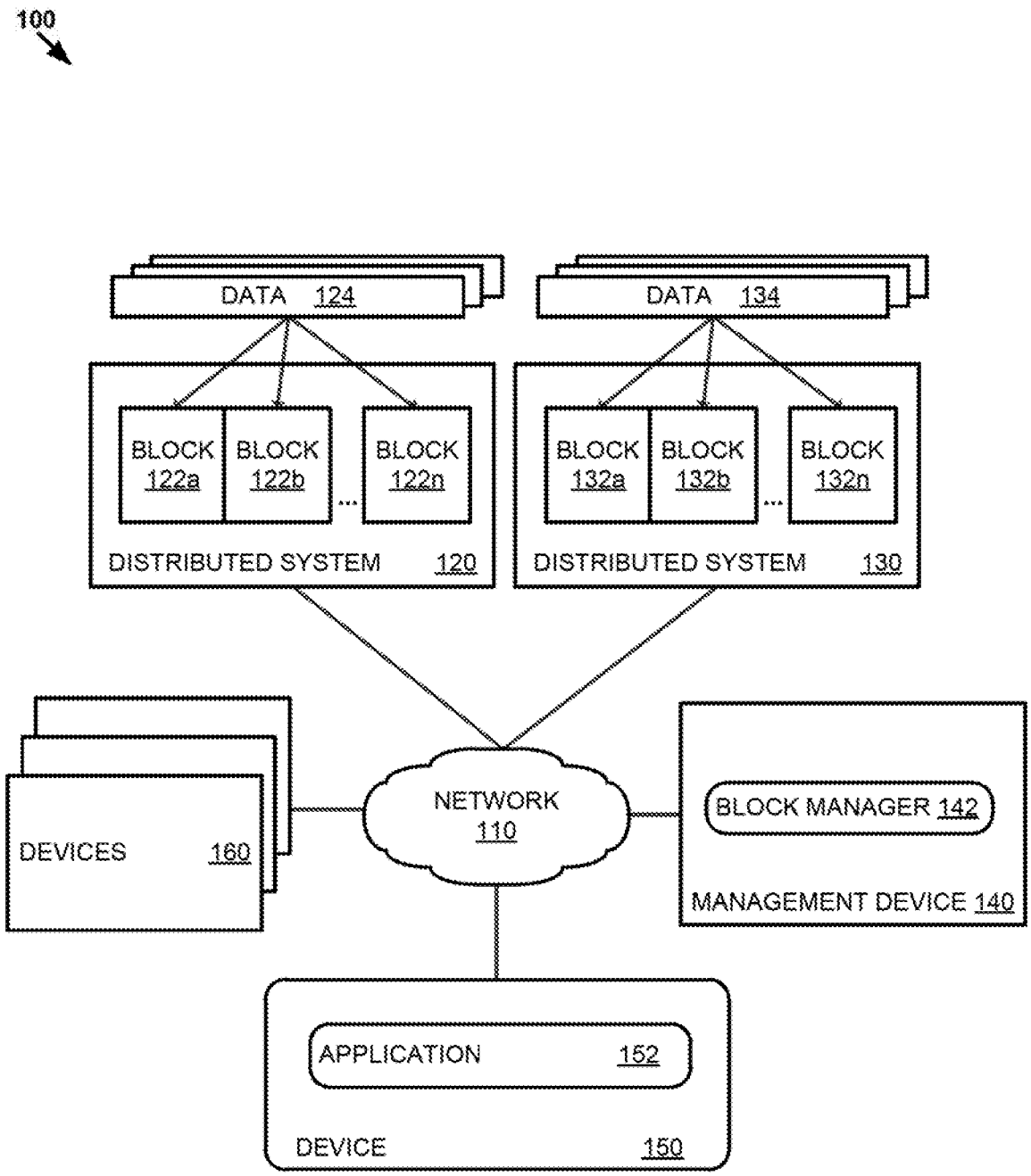
FIG. 1 illustrates an example of a computing environment used for managing encrypted data stored in one or more blocks of a data structure, according to one embodiment.

Embodiments presented herein provide techniques for managing data in distributed systems. More specifically, embodiments presented herein involve re-encrypting data stored in data structures such as hash chains.

Data may be maintained in a distributed system which comprises one or more blocks. For example, the one or more blocks may make up a data structure such as a hash chain. In some embodiments, the distributed system may maintain data associated with one or more applications. Every time an application (or another entity) writes a data update to the chain, it is appended as a new block. Each block may be resistant to modification and may contain cryptographic information that links to the preceding block and/or the subsequent block. Because data remains on the chain indefinitely, security vulnerabilities may arise over time. For example, encryption techniques used in encrypting data on the chain may become outdated, or cryptographic information may become compromised. It may be challenging to ensure the security of the data on the chain when such a vulnerability arises due to the nature of a hash chain (e.g., blocks on the chain are inherently resistant to modification, so updating the blocks with new encryption may not be practicable). As such, embodiments of the present disclosure involve re-encrypting data on the chain and storing the re-encrypted data in the first one or more blocks of a new chain.

According to one embodiment, a block manager retrieves data (which may be encrypted) from a chain and places the data in a container. For example, the data may comprise some or all of the data on the chain, the encryption of which may be compromised (e.g., due to a vulnerability discovered in the encryption). The block manager then applies an encryption technique (e.g., a cryptographic hash) to the container. The encryption technique may be different than the encryption technique used to encrypt the data previously (e.g., different than the outdated or compromised encryption technique). The block manager then creates a new chain, adding the encrypted container as the first block of the new chain. Alternatively, the block manager may store the encrypted container in a separate storage (e.g., a drive accessible over a network such as the internet) and add a reference to the location of the encrypted container as the first block of the new chain. In certain embodiments, the first block also stores an encryption key (e.g., the cryptographic hash) of the encrypted container. When an entity (e.g., an application) requests the data from the chain, a managing entity of the chain (e.g., the block manager) may retrieve the data from the location stored in the first block and verify its integrity using the encryption key.

The techniques described herein may be adapted for use by a broad variety of software applications, online or web services, software features, or support services where data may be stored in distributed systems. Additionally, though particular computing devices or components are described herein as performing certain tasks (e.g., storing and retrieving data, performing encryption, creating chains and blocks, etc.), such tasks may be performed by one or more additional local or remote computing devices or components (e.g., connected via a wired or wireless network).

FIG. 1 illustrates an example of a computing environment 100 used to manage data stored in one or more blocks of a data structure, according to embodiments of the present disclosure. As shown, the computing environment 100 includes distributed systems 120 and 130, management device 140, device 150, and devices 160, connected via network 110. The network 110, in general, may be a wide area network (WAN), local area network (LAN), wireless LAN (WLAN), personal area network (PAN), a cellular network, etc. In a particular embodiment, the network 110 is the Internet.

Distributed systems 120 and 130 may each comprise one or a plurality of devices (e.g., separate computing systems such as servers) sharing resources and capabilities in order to provide users with a single and integrated coherent network comprising blocks 122a-n and 132a-n. In some embodiments, distributed systems 120 and 130 comprise data structures such as hash chains (e.g., blockchains). Blocks 122a-n and 132a-n may, for example, comprise blocks in hash chains Data 124 and 134 may, for example, comprise data associated with application 152 (and/or other entities, such as applications and/or services executing on devices 160), and data 124 and 134 may be stored in one or more of blocks 122a-n and 132a-n. Distributed systems 120 and 130 may manage the addition and removal of blocks 122a-n and 132a-n from their respective chains using any number of known techniques, such as a consensus protocol or a trusted authority protocol. In certain embodiments, "miners" may be employed to ensure the integrity of modifications to a distributed system, such as distributed systems 120 and 130.

Distributed systems 120 and 130 may return data 124 and 134 in response to requests (e.g., from application 152), and may also include cryptographic link information from one or more of blocks 122a-n and 132a-n (which were the source of requested data) in the response for security and verification purposes. Distributed systems 120 and 130 may also include root hashes, hash trees, and other relevant information in a response.

Management device 140 may comprise on or more local or remote computing systems (e.g., one or more servers) for performing operations related to management of distributed systems 120 and/or 130. As shown, management device 140 comprises block manager 142. Block manager 142 may, for example, perform operations related to managing data stored in one or more blocks of a data structure (e.g., data 124 stored in blocks 122a-n of distributed system 120). In certain embodiments, for example, block manager 142 may retrieve data 124 from blocks 122a-n (e.g., data associated with application 152). Example components of block manager 142 are described in more detail with respect to FIG. 2, below.

In some instances, data 124 may have been previously encrypted using one or more techniques (e.g., cryptographic hash) that have subsequently become outdated, compromised, or the like. Therefore, one of the inherent purposes of distributed system 120, security, may be compromised. In order to mitigate a compromised distributed system, block manager 142 may generate a new container object comprising the data 124. In some embodiments, block manager 142 may decrypt data 124 before storing it in the container object, while in other embodiments, block manager 142 may not decrypt data 124 before storing it in the container object. Block manager 142 may then perform an encryption technique on the container object. For example, the encryption technique may comprise an encryption technique (e.g., cryptographic hash, symmetric encryption, asymmetric encryption, or the like) that is different than the outdated or compromised encryption technique previously applied to data 124. Block manager 142 may then create a new data structure, such as a new hash chain (e.g., blocks 132a-n on distributed system 130, which may at first only comprise one block, 132a). The first block of the new chain (e.g., block 132a) may comprise the encrypted container object. In another embodiment, block manager 142 may store the encrypted container object in a separate storage (e.g., one of devices 160), and may add a reference to the storage location of the encrypted container object as the first block of the new chain (e.g., block 132a). In certain embodiments, block manager 142 may also include an encryption key (e.g., a cryptographic hash) of the original encrypted data (e.g., data 124) n the first block of the new chain (e.g., 132a). In certain embodiments, the encrypted container object (or, alternatively, the reference to the location of the encrypted container object) may be stored in more than one of the first blocks on the new chain (e.g., blocks 132a-n). Once block manager 142 has created the new chain (e.g., blocks 132a-n), in some embodiments, block manager 142 may erase or otherwise restrict access to blocks 122a-n, as the security of data 124 may be compromised.

In some embodiments, block manager 142 responds to requests (e.g., from application 152) for data (e.g., data 134) stored on the new chain (e.g., blocks 132a-n). For example, data 134 may comprise the data stored in the encrypted container. When application 152 (or any other entity, such as one of devices 160) requests data 134, block manager 142 may return the data 134 in response, and, in some embodiments, may include an encryption key (e.g., the cryptographic hash) of data 134 in the response. In some embodiments, data 134 may comprise the location of the encrypted container object, and block manager 142 may retrieve the encrypted container object from the location before using an encryption key stored in block 132a to verify the integrity of the data in the encrypted container object (e.g., using the cryptographic hash) and providing the data to the requesting entity. In some embodiments, block manager 142 may decrypt some or all of data 134 (e.g., using an encryption key) before returning it to a requesting entity.

Device 150 may be a computing system, such as a desktop or laptop computer, tablet, mobile phone, Internet of Things (IoT) device, other smart device, or the like, which executes one or more applications that maintain data on distributed systems 120 and/or 130 (which may, for example, comprise hash chains or blockchains). For example, device 150 includes an application 152. The application 152 may be representative of a component of a client server application (or other distributed application), which can communicate with distributed systems 120 and/or 130 over network 110. Application 152 may be a conventional software application (e.g., a tax preparation application) installed on device 150, and may communicate with distributed systems 120 and/or 130 over network 110 in order to store, manage, and retrieve data (e.g., data 134 stored in blocks 132a-n).

Devices 160 may comprise one or more physical or virtual computing entities, such as servers, personal computing devices, and/or storage entities. In certain embodiments, for example, block manager 142 may store data such as an encrypted container (e.g., data that has been placed in a container and re-encrypted according to techniques described herein) in one or more of devices 160. As above, in some instances a reference to the location of the encrypted container may be stored in a block of a distributed system, such as in block 132a in distributed system 130.

Techniques described herein allow for data stored in a distributed system, such as in a hash chain, to be re-encrypted while still maintaining a guarantee of the data's integrity on the chain (e.g., by storing the re-encrypted data in a new hash chain, which is resistant to modification and provides a variety of security features). Furthermore, embodiments of the present disclosure are more efficient and may require fewer processing resources than alternative techniques for re-encrypting data stored in distributed systems. For example, by placing all of the data from a plurality of blocks into a container and applying an encryption technique once to the container, rather than applying encryption techniques to the data from each block separately, techniques described herein may beneficially reduce the processing resources necessary to manage the encrypted data. Furthermore, certain embodiments may improve storage efficiency in distributed systems. For example, when an encrypted container is stored separately from a distributed system (e.g., in a remote storage), and the first one or more blocks contain a reference to the storage location of the encrypted container, storage resources of the distributed system are freed up. Due to the fact that storing data in certain types of data structures such as hash chains may be expensive, and may require additional processing resources (e.g., to employ established protocols for validating each new block), storing an encrypted container separately from such data structures may be advantageous for the functioning of the system.

Figure 2:
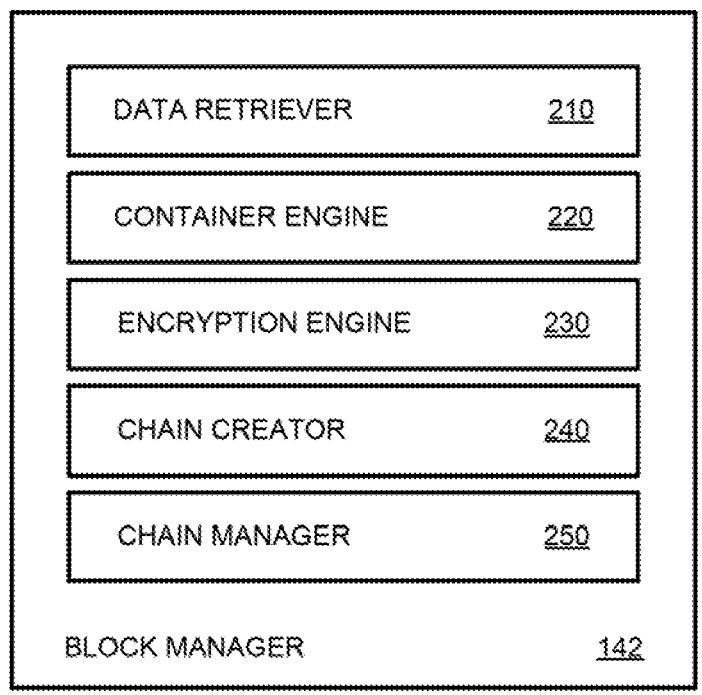
FIG. 2 illustrates components of a block manager, according to one embodiment.

FIG. 2 illustrates components of block manager 142 described relative to FIG. 1, according to one embodiment. Block manager 142 may be a part of management device 140, which may perform operations related to management of data storage in distributed systems, such as hash chains. As shown, the block manager 142 comprises a data retriever 210, a container engine 220, an encryption engine 230, a chain creator 240, and a chain manager 250. Each of these components may perform functions of block manager 142 associated with techniques described above with respect to FIG. 1. For example, data retriever 210 may retrieve data 124 from blocks 122a-n on distributed system 120. Data 124 may, for example, comprise encrypted data stored on a hash chain for which an encryption technique has become outdated or compromised. In certain embodiments, data 124 comprises data associated with application 152, which was previously added to distributed system 120 using data verification and encryption techniques known in the art, such as those commonly employed for hash chains. Data retriever 210 may retrieve data 124 and provide data 124 to container engine 220, which may place data 124 in a newly created container object. In one embodiment, container engine 220 may decrypt data 124 before placing it in the container object. In other embodiments, container engine 220 does not decrypt data 124 before placing it in the container object. Container engine 220 may provide the container object to encryption engine 230, which may apply an encryption technique to the container object. For example, the encryption technique may comprise a cryptographic hash, a symmetric encryption technique, an asymmetric encryption technique, or the like. The encryption technique may be different than the outdated or compromised encryption technique previously used to encrypt data 124 (e.g., when data 124 was first added to distributed system 120).

Encryption engine 230 may provide the encrypted container object to chain creator 240, which may create a new data structure, such as a new hash chain (e.g., represented by blocks 132a-n of distributed system 130, which may at first only comprise one block 132a). In some embodiments, chain creator 240 includes the encrypted container object in the first block 132a of the new chain. In other embodiments, chain creator 240 (or another component) stores the encrypted container object in a separate storage (e.g., separate from distributed systems 120 and 130, such as in one or more of devices 160), and includes the storage location of the encrypted container in the first block 132a of the new chain. Chain creator 240 may also include an encryption key of the encrypted container (e.g., a cryptographic hash) in the first block 132a of the new chain. The encryption key may allow for verification of the integrity of the encrypted container stored separately, as modification of the encrypted container would change the encryption (e.g., the hash).

Chain manager 250 may perform various operations related to ongoing management of data stored on chains such as blocks 122a-n and 132a-n. For example, once chain creator 240 has created the new chain with the re-encrypted data or the location of the re-encrypted data, chain manager 250 may ensure that data 124 is no longer accessible. For example, the security of data 124 may be threatened due to an outdated or compromised encryption technique. As such, chain manager 250 may, for example, erase data 124 from blocks 122a-n. Blocks 122a-n may alternatively or additionally be taken offline (e.g., disconnected from network 110), distributed system 120 may be disconnected, or chain manager 250 may place access restrictions on data 124. For example, chain manager 250 may place an access restriction on blocks 122a-n such that only an approved entity (e.g., device 150) may access the data, thereby preventing access by other entities which may not be trusted (e.g., devices 160).

Figure 3:
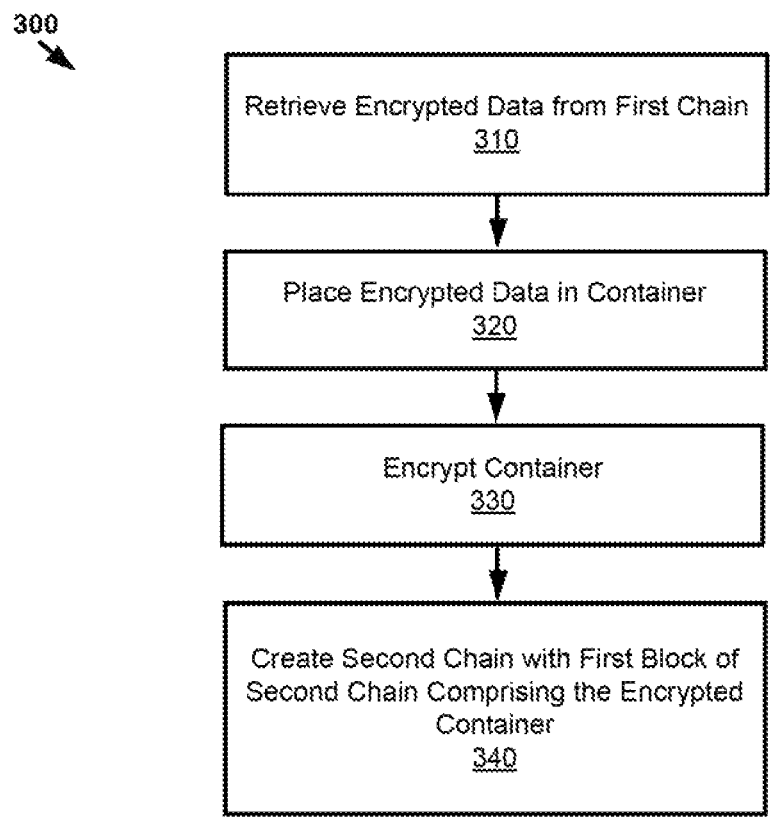
FIG. 3 illustrates example operations for managing encrypted data stored in one or more blocks of a data structure, according to one embodiment.

FIG. 3 illustrates example operations 300 for managing data stored in one or more blocks of a data structure, according to one embodiment. Operations 300 may be performed, for example, by a block manager, such as block manager 142 of management device 140 in FIG. 1.

At step 310, block manager retrieves data (e.g., data 124 in FIG. 1) from a first chain (e.g., blocks 122a-n of distributed system 120 in FIG. 1). The retrieved data may be previously encrypted using an outdated or compromised encryption technique. The retrieved data may comprise data associated with an application or service (e.g., application 152 in FIG. 1), which may have been added to a distributed system according to techniques commonly employed with hash chains (e.g., validation and approval using consensus or authoritative protocols and encryption using cryptographic hash techniques).

At step 320, the block manager places the data in a container. For example, the block manager may create a new container object comprising the data. The data, having been maintained in a data structure such as a hash chain, may include cryptographic links between blocks (e.g., each of blocks 122a-n may comprise a cryptographic link to the previous block in the chain, as is customary with hash chains), and this cryptographic link information may be included in the container object (e.g., so that the integrity of the data may be ensured).

At step 330, the block manager encrypts the container. For example, block manager 142 may apply an encryption technique such as a cryptographic hash function to the container object in order to generate an encrypted container. The encryption technique may, for example, be different than the outdated or compromised encryption technique. This may allow the security of the data to be enhanced using a more current or non-compromised encryption technique.

Though not shown in FIG. 3, block manager may store the encrypted container in separate storage, such a remote storage location. For example, the block manager may store the encrypted container in one or more of devices 160 in FIG. 1, which may be remote from distributed systems 120 and 130 and accessible over network 110. Storing the encrypted container separately from the distributed system may allow for a more efficient use of resources because storing data on hash chains can be processor and space-intensive. For example, some hash chains (e.g., blockchains) may employ extensive data validation techniques and/or may involve monetary costs to add new blocks to a chain (e.g., as a technique of ensuring the authenticity and/or quality of data). Furthermore, some hash chains may have data size restrictions for blocks, and the entire contents of a first chain may be too large to fit in a single block of a second chain.

At step 340, the block manager creates a second distributed system, which may at first comprise only a first block including the encrypted container. Where the encrypted container is stored outside of the second distributed system, a block in the second distributed system may include a reference to the location of the encrypted container. In this way, the information stored in the encrypted container is still a part of the new distributed system, albeit in a representative capacity. Moving forward, new data is stored in the new distributed system in new blocks, and each block is cryptographically linked to the previous block in the hash chain. In some embodiments, the block manager may also include information about the encryption technique employed in step 330, such as an encryption key (e.g., cryptographic hash) of the encrypted container in the first block of the second distributed system. This may allow for verification of the integrity of the encrypted container. For example, when an entity (e.g., application 152 in FIG. 1) requests a data item which is stored remotely in the encrypted container, the block manager may retrieve the encrypted container from the storage location stored in a block of the second distributed system, and may ensure that the encryption key (e.g., cryptographic hash) stored in the block is a match with the encrypted container. This may be an effective security technique, as the data in the encrypted container cannot be modified without affecting the encryption, which would be detected upon comparing the encryption key stored in the block with the encrypted container that was retrieved. A mismatch may result in the retrieved data being discarded and/or other remedial action (e.g., notification of an administrator of the chain).

Figure 4A:
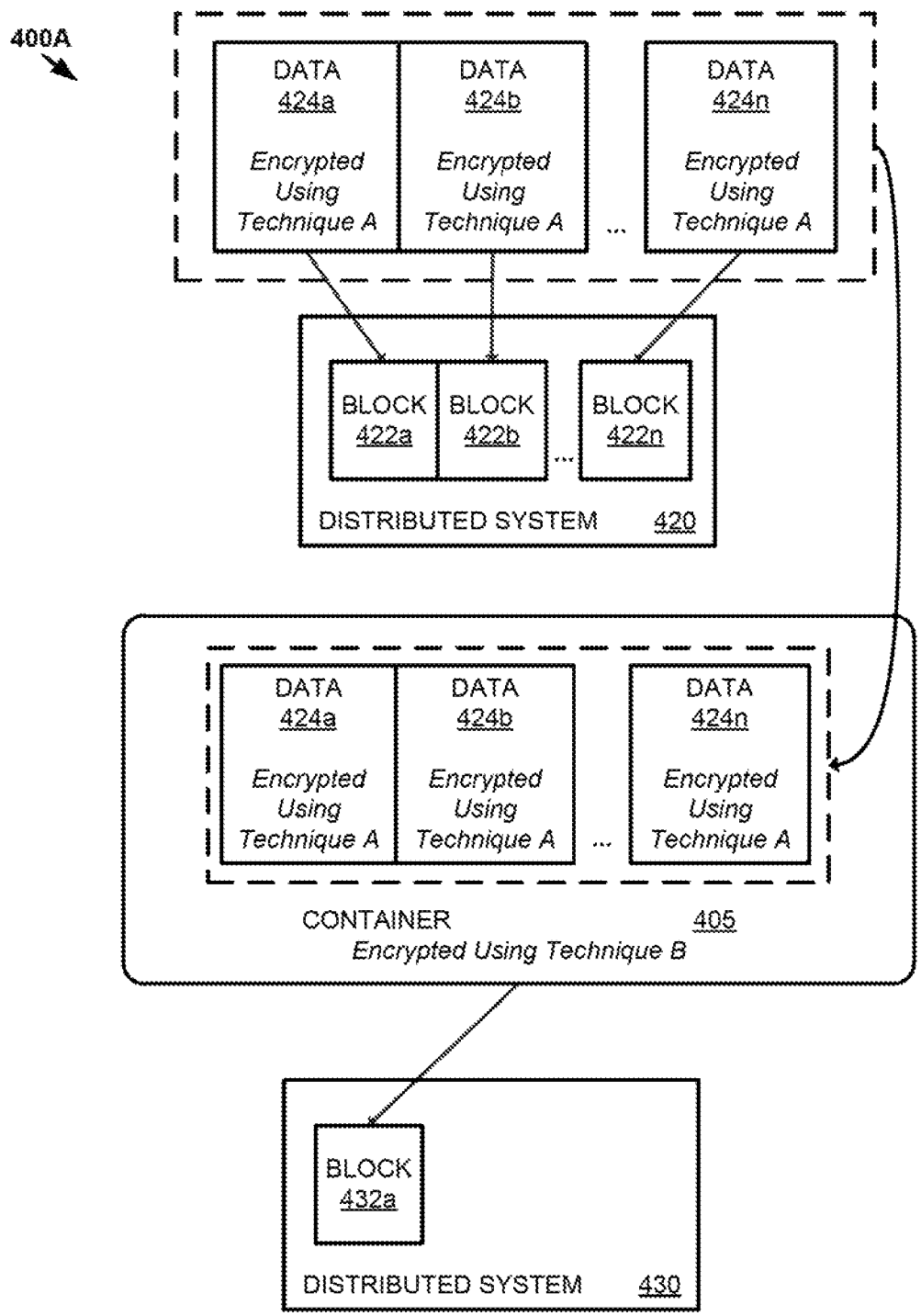
FIGS. 4A and 4B illustrate example data storage arrangements according to embodiments of the present disclosure.
Figure 4B:
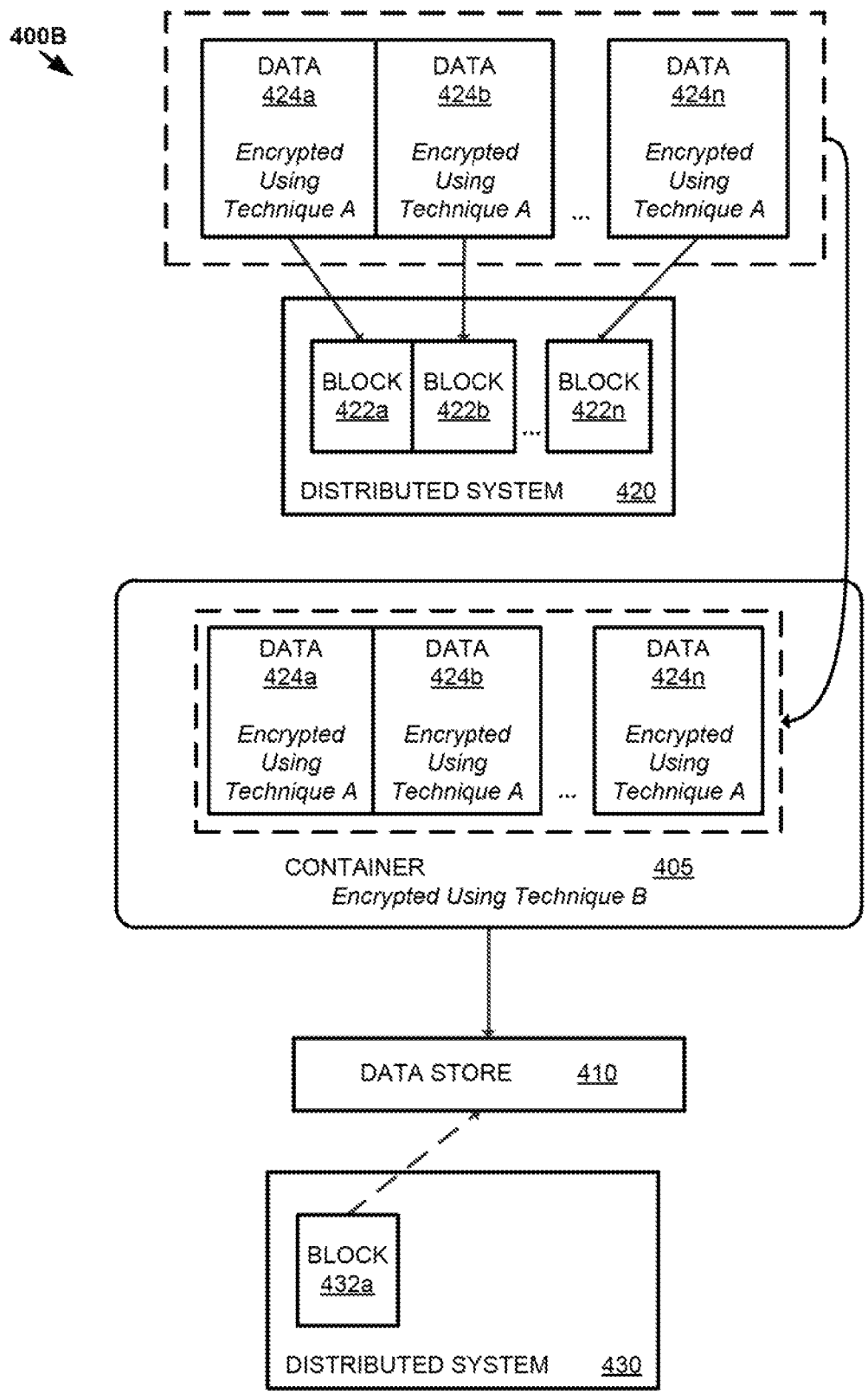

FIGS. 4A and 4B illustrate data storage arrangements according to embodiments of the present disclosure. For example, FIGS. 4A and 4B may further illustrate embodiments of operations described above with respect to FIG. 3.

As shown in FIG. 4A, a storage arrangement 400a includes distributed system 420, which comprises blocks 422a-n. For example, distributed system 420 may comprise a first hash chain. Each of blocks 422a-n comprises an item of data 424a-n, each of which may be encrypted using a first technique (e.g., "technique A", which may comprise a particular cryptographic hash, symmetrical encryption algorithm, or the like). Each of data 424b-n may comprise a cryptographic link to the previous data item. For example, data 424b in block 422b may comprise a cryptographic link to data 424a in block 424a.

As shown, data 424a-n is stored in container 405, which is encrypted using a second technique (e.g., "technique B", which may comprise a particular cryptographic hash, symmetrical encryption algorithm, or the like, which is different than "technique A"). Container 405 is stored in a first block 432a of distributed system 430, which may comprise a second hash chain. For example, container 405 and distributed system 430 may be created by block manager 142 of FIG. 1 as part of operations 300 of FIG. 3.

As shown in FIG. 4B, a storage arrangement 400b includes the same distributed system 420 and container 405 described above with respect to FIG. 4A. As described above, container 405 stores the data 424a-n (originally encrypted using "Technique A") from distributed system 420, and is encrypted using "Technique B". In storage arrangement 400b, however, unlike in storage arrangement 400a, container 405 is stored in a data store 410. Data store 410 may be a remote storage device, such as one of devices 160 in FIG. 1. As shown in FIG. 4B, block 432a of distributed system 430 comprises a reference to the storage location of container 405 in data store 410. As described herein, block 432a may further comprise an encryption key, such as a cryptographic hash used in "technique A".

Figure 5:
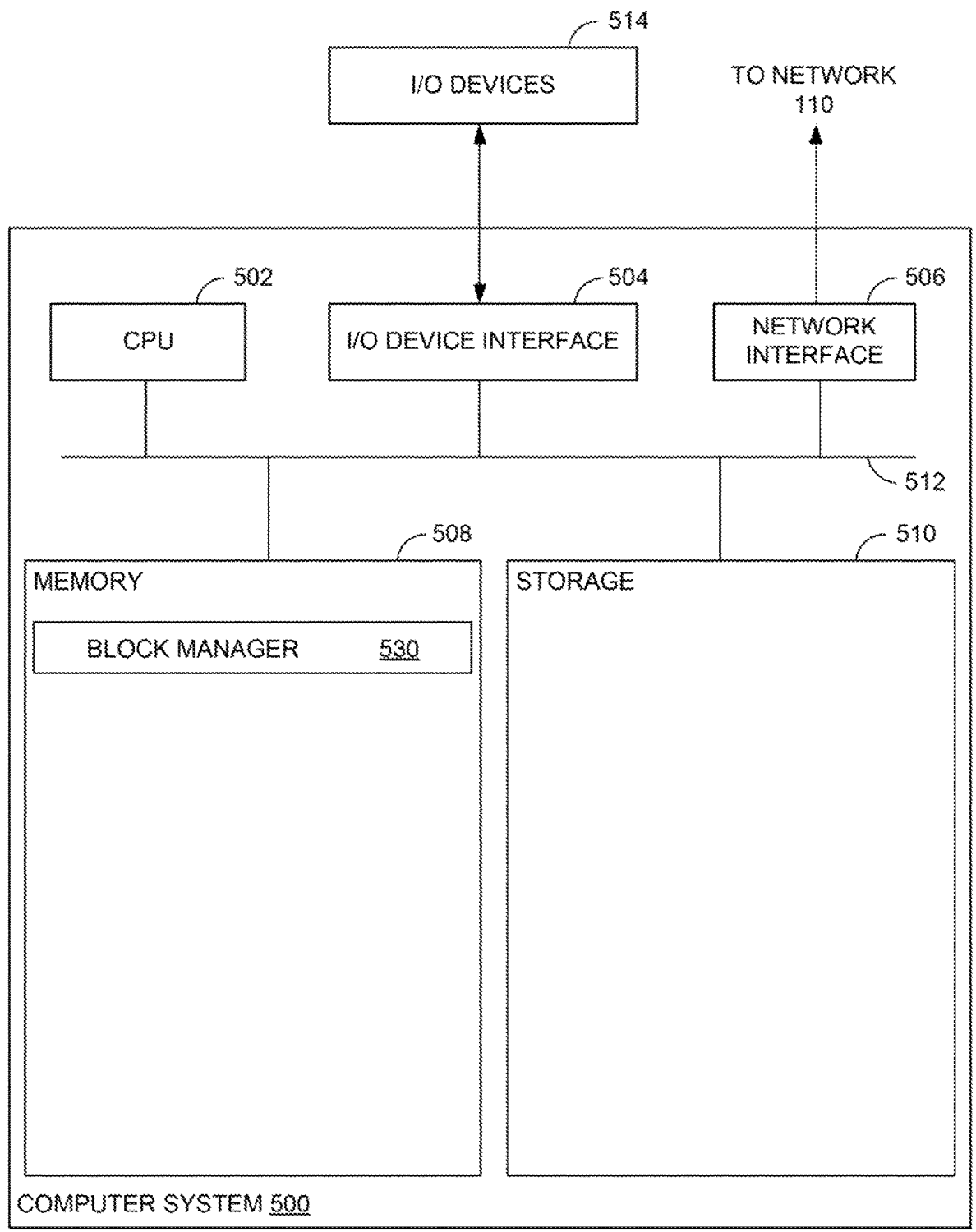
FIG. 5 illustrates an example computing system used for managing encrypted data stored in one or more blocks of a data structure, according to one embodiment.

FIG. 5 illustrates an example development system used for managing encrypted data stored in one or more blocks of a data structure, according to embodiments of the present disclosure. As shown, the system 500 includes, without limitation, a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a block manager 530, which may comprise a component (e.g., local or distributed) which manages data maintained on a distributed system, such as a hash chain (e.g., functionality described above with respect to FIGS. 1-4). Block manager 530 may employ efficient techniques for re-encryption of data stored in distributed systems as described herein. The block manager 530 in memory 508 may communicate with other devices (e.g., distributed systems 120 and 130, device 150, and devices 160) over network 110 through network interface 506 (e.g., in order to access, modify, store, group, send, and otherwise process data associated with blocks 122*a-n* and 132*a-n* as described herein).

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for managing encrypted data stored in one or more blocks of a first data structure, comprising:
   retrieving, by a data retriever, the encrypted data from the one or more blocks;
   placing the encrypted data in a container object;
   applying, by an encryption engine, an encryption technique to the container object to generate an encrypted container object;
   generating a second data structure, wherein the first data structure and the second data structure comprise hash chains, and wherein a first block of the second data structure comprises either;
   the encrypted container object; or
   information related to the encrypted container object.

2. The computer implemented method of claim 1, wherein the encrypted data is encrypted with a hash.

3. The computer-implemented method of claim 1, further comprising:
   storing the encrypted container object separately from both the first data structure and the second data structure.

4. The computer-implemented method of claim 3, wherein the information related to the encrypted container object comprises the hash and a storage location of the encrypted container object.

5. The computer-implemented method of claim 1, further comprising: either erasing or prohibiting access to the first data structure.

6. The computer-implemented method of claim 1, wherein the encryption technique is different than an encryption technique used to generate the encrypted data.

7. A computing device for managing data of an application, the computing device comprising:
   a memory comprising computer-executable instructions; and
   a processor configured to execute the computer-executable instructions and to cause the computing device to:
   retrieve, by a data retriever, the encrypted data from the one or more blocks;
   place the encrypted data in a container object;
   apply, by an encryption engine, an encryption technique to the container object to generate an encrypted container object;
   generate a second data structure, wherein the first data structure and the second data structure comprise hash chains, and wherein a first block of the second data structure comprises either:
   the encrypted container object; or
   information related to the encrypted container object.

8. The computing device of claim 7, wherein the encrypted data is encrypted with a hash.

9. The computing device of claim 7, wherein the processor is further configured to cause the computing device to: store the encrypted container object separately from both the first data structure and the second data structure.

10. The computing device of claim 9, wherein the information related to the encrypted container object comprises the hash and a storage location of the encrypted container object.

11. The computing device of claim 7, wherein the processor is further configured to cause the computing device to: either erase or prohibit access to the first data structure.

12. The computing device of claim 7, wherein the encryption technique is different than an encryption technique used to generate the encrypted data.

13. A non-transitory computer-readable medium comprising instructions that when executed by a computing device cause the computing device to perform a method for managing encrypted data stored in one or more blocks of a first data structure, the method comprising:

retrieving, by a data retriever, the encrypted data from the one or more blocks;

placing the encrypted data in a container object;

applying, by an encryption engine, an encryption technique to the container object to generate an encrypted container object;

generating a second data structure, wherein the first data structure and the second data structure comprise hash chains, and wherein a first block of the second data structure comprises either:

the encrypted container object; or information related to the encrypted container object.

14. The non-transitory computer-readable medium of claim 13, wherein the encrypted data is encrypted with a hash.

15. The non-transitory computer-readable medium of claim 13, wherein the method further comprises: storing the encrypted container object separately from both the first data structure and the second data structure.

16. The non-transitory computer-readable medium of claim 15, wherein the information related to the encrypted container object comprises the hash and a storage location of the encrypted container object.

17. The non-transitory computer-readable medium of claim 13, wherein the method further comprises: either erasing or prohibiting access to the first data structure.

18. The non-transitory computer-readable medium of claim 13, wherein the encryption technique is different than an encryption technique used to generate the encrypted data.

* * * * *